United States Patent [19]

Van Voorhis

[11] Patent Number: 5,059,901
[45] Date of Patent: Oct. 22, 1991

[54] VISIBLE LIGHT LASER TACHOMETER FOR SENSING ROTATIONAL SPEED OF AN OBJECT

[75] Inventor: James B. Van Voorhis, Roane County, Tenn.

[73] Assignee: Technology for Energy Corporation, Knoxville, Tenn.

[21] Appl. No.: 519,101

[22] Filed: May 4, 1990

[51] Int. Cl.⁵ .............................................. G01P 3/36
[52] U.S. Cl. ................................. 324/175; 356/356; 356/358; 356/28.5; 356/29; 250/231.13; 324/166
[58] Field of Search ............... 324/160, 166, 173, 175; 356/27-29, 356, 358; 250/231.13; 364/565

[56] References Cited

U.S. PATENT DOCUMENTS

| 4,181,432 | 1/1980 | Flower . |
| 4,204,115 | 5/1980 | Boldridge, Jr. ................. 324/175 X |
| 4,638,155 | 1/1987 | Dorr .............................. 324/175 X |
| 4,712,853 | 12/1987 | Howard . |
| 4,880,966 | 11/1989 | Goodrich et al. .............. 324/175 X |

FOREIGN PATENT DOCUMENTS 1018660 10/1957 Fed. Rep. of Germany ...... 324/175

Primary Examiner—Kenneth A. Wieder
Assistant Examiner—Warren S. Edmonds
Attorney, Agent, or Firm—Pitts & Brittian

[57] ABSTRACT

A laser light tachometer for measuring the rotational speed of a selected rotating body without making physical contact with that body. The laser technology art is used to provide a beam of light, visible even under extremely bright ambient light conditions, to be used to measure the rotational speed of a rotating device from greater distances than previously possible. A diverging beam of laser light is collimated and transmitted to a rotating body the RPM of which is to be measured. The rotating body modulates the beam and reflects it back to the tachometer where it is focused onto a photodetector, which converts it into an electrical signal representative of the speed of the rotating body. Provisions are made for direct digital readout and for supplying the signal to other devices.

11 Claims, 3 Drawing Sheets

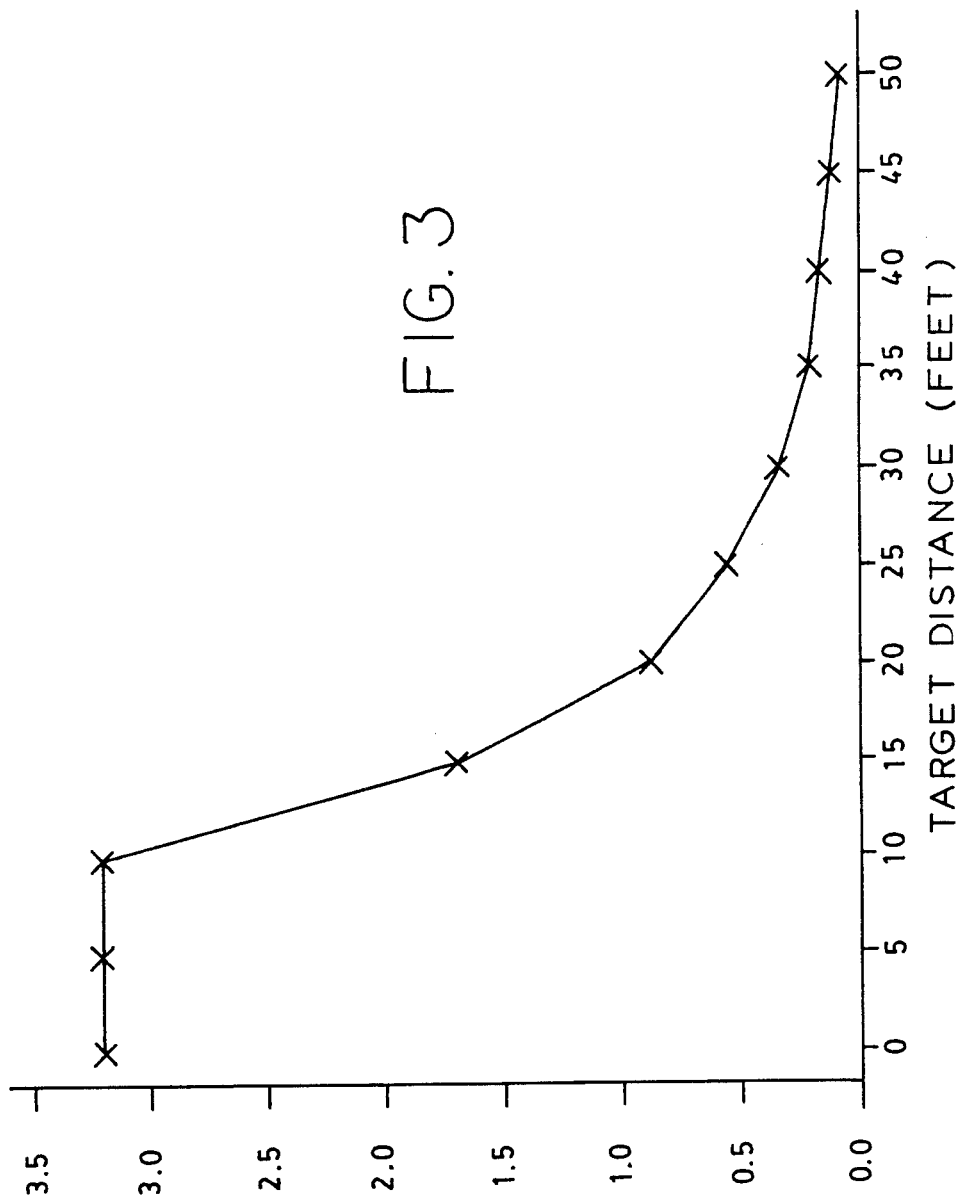

VISIBLE LIGHT LASER TACHOMETER FOR SENSING ROTATIONAL SPEED OF AN OBJECT

DESCRIPTION

1. Technical Field

This device relates to tachometers in general, and more particularly concerns a laser-based tachometer.

2. Background Art

Tachometers are widely used to measure the rotational speed of motors, centrifuges, shafts, dics, turbines, gear trains, and like devices used in various machines such as internal combustion engines, for example. The angular speed of particular elements is an important parameter which can be used, either separately or in conjunction with other measured parameters, to determine the condition of rotating machines.

There are two types of tachometers, contacting and non-contacting, with versions of each commercially available at the present time. Contacting type tachometers require that a spindle be placed in contact with the rotating member in order to measure its rotating speed.

Non-contacting tachometers utilize visible polychromatic and invisible monochromatic electromagnetic beams, or proximity probes using magnetic principles. Tachometers using electromagnetic beams normally are targeted on reflective tape attached to the rotating element whose RPM is being measured. While these devices provide touchless measurements of RPM for rotating elements, in most cases their instrument-to-target-distance effectiveness is very limited. Typical ranges are between zero and three feet. Moreover, these devices have poor ambient light noise immunity when operated near the extreme end of their source-to target distances. Also, most existing optical tachometers are difficult to align in bright outdoor light due to low visibility of the projected light beam. Tachometers utilizing a modulated monochromatic light source and synchronous detection techniques have good ambient noise immunity, however they have the same range limitations as other commercially available tachometers. Tachometers using magnetic probes, while immune to ambient light effects, have very short working distances, usually on the order of a few inches or less. Those tachometers which employ electromagnetic radiation in the invisible range are relatively immune to ambient light interference, but, because they are invisible, they must utilize auxiliary means of detecting the targeting of a beam on the surface of a rotating member whose angular speed is to be determined.

Tachometers typical of devices commercially available are described in the *Instrument Engineers' Handbook*, written by Bela G. Liptak, Editor in Chief, published by the Chilton Book Company, 1982, and *Transcatalog Instrumentation Handbook*, Transcat, 1985. The devices described in the above-mentioned handbooks all have ranges for rotation detection of between zero and three feet. None, however, can be utilized with confidence in situations where the separation distance between the light source and the reflective target exceeds three feet.

U.S. Patents known to exist regarding the technology of the present invention include U.S. Pat. No. 4,712,853, issued to P. Guy Howard, and U.S. Pat. No. 4,181,432, issued to Robert A. Flower.

The device of Howard is designed to get a motor of a scanning device up to speed quickly by using a laser in a closed loop feedback circuit.

The velocity measuring device of Flower converts a laser output into a frequency proportional to the relative motion of a surface. Neither of these devices is intended to specifically provide an indication of the RPM of a rotating device.

Given the fact of the limitations of the prior art devices as discussed above, it was desired to provide an invention which would possess improved operational ranges and ambient electromagnetic immunity over those available in existing tachometers.

Accordingly, it is a principal object of the present invention to provide an improved non-contact tachometer with an effective range of from zero to thirty feet which would be of significant benefit in many applications, particularly in those situations where monitoring in close proximity to the machine containing the rotating element can be hazardous to personnel, or access to the equipment is difficult to obtain.

An additional object of the present invention is to provide such an improved tachometer which will be immune to ambient light effects under all conditions.

Another object of the present invention is to provide such an improved tachometer which can be operated outdoors under bright sunshine conditions.

A further object of the present invention is to provide such an improved tachometer with a visible beam of electromagnetic energy which can be visibly targeted on a distant reflective element.

Yet another object of the present invention is to provide such an improved tachometer which can be used on rotational or translational elements having singular man-made or natural surface discontinuities in their reflectivities.

These, and other objects and advantages of the present invention, will become readily apparent from the following detailed description, when taken together with the accompanying drawings.

BRIEF DESCRIPTION OF THE DRAWINGS

The following drawings illustrate a preferred embodiment of the invention and, when taken together with the accompanying description, serve to explain the principles and structure of the invention.

FIG. 3 is a graph of the optical receiver signal voltage versus tachometer-to-target distance.

DISCLOSURE OF THE INVENTION

Figure 1:
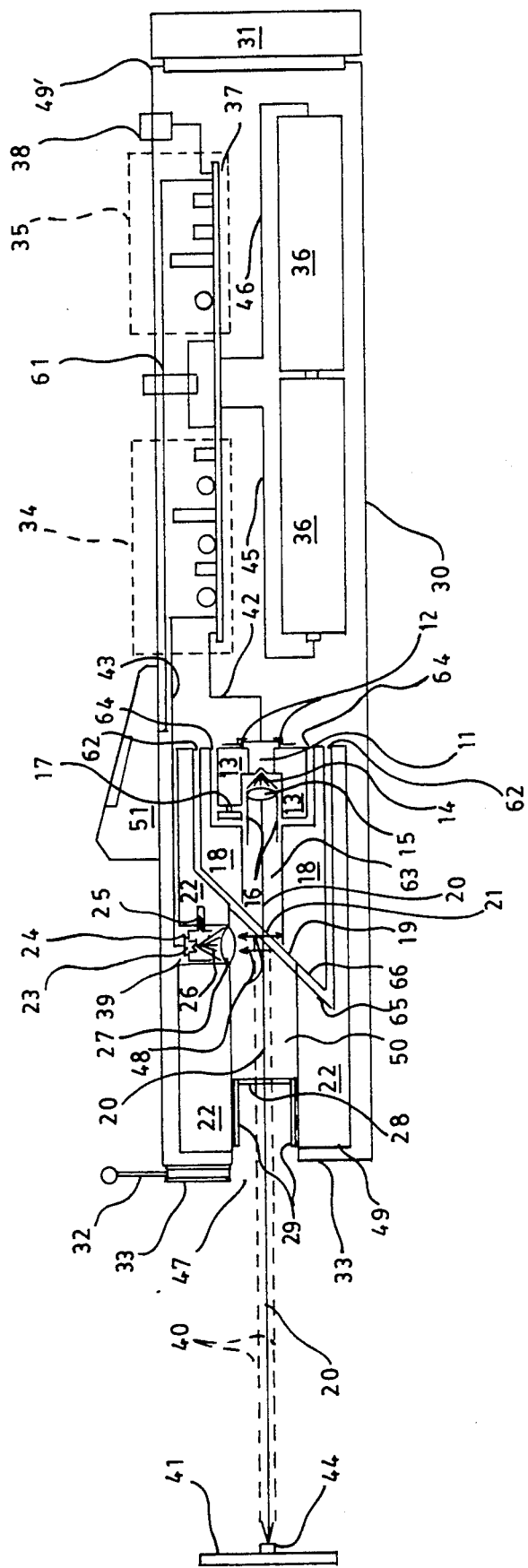
FIG. 1 is a side view in section of a device constructed in accordance with various features of the present invention, showing a laser diode, photodiode, and optical system/beam processor with on-board display.

In accordance with the present invention, there is provided an improved optical, non-contact tachometer which utilizes the art of laser technology to achieve improved operating range and ambient noise immunity over those available in existing tachometers. The present laser tachometer is comprised of a semiconductor diode laser whose operating frequency is within the visible light spectrum, typically at a wavelength of 670 nanometers (nm), together with a convex focusing lens mounted in close proximity to the emitting surface of the laser diode, both of which are mounted in a cylindrical housing which is used to maintain a fixed spatial relationship between the focusing lens and the laser diode; a cylindrical optical housing designed to receive the diode/focusing lens assembly housing at its first end, a dichroic filter mounted at the second end of the cylindrical optical housing, a beam splitter disposed internally in the optical housing between the terminal end of the diode/lens housing and the dichroic filter, a focusing lens/PIN photodiode assembly which senses light reflected back into the optical housing tube from a reflective target and converts it into an electrical signal, and an electronic signal conditioning circuit for processing the output signal from the photodiode to drive an LCD or LED display, or to provide electrical pulses to a data logger. The diode laser is powered by a diode driver circuit connected to a dc voltage supply, which also powers the photodiode and signal conditioning circuitry. The result of all this is a source of high intensity, coherent (red) light which may be collimated for illumination of a distant target, typically a rotating machine element to which has been affixed a strip of reflective tape. The reflected light is returned to the tachometer via an optical system and is converted to an electrical signal. This electrical signal can then be processed to drive an LED or LCD display to indicate revolutions per unit of time, or to provide electrical pulses for use by vibration monitoring, balancing, or other diagnostic equipment.

BEST MODE FOR CARRYING OUT THE INVENTION

Referring to the drawings, wherein like numerals designate like parts, a laser light tachometer for measuring the rotational speed of a selected rotating body without making physical contact with that body is illustrated.

Beginning with FIG. 1, a device constructed in accordance with various features of the present invention is illustrated generally at 10. The device 10 is comprised of a housing 30 and a plurality of components housed therein. In a preferred embodiment, housing 30, which can be constructed of metallic or non metallic material, is of a size, weight, and shape suitable for being held in the hand while in use. A pistol-grip type holder (not shown) can be attached to or made an integral part of housing 30. Housing 30, which has been made internally conformable to the shapes of the components housed therein, has a first end 49, and a second end 49'. The first end 49 is pierced by a central cylindrical opening 47, which can be selectively covered by a beam shutter/dust cover 32. Beam shutter/dust cover 32 is slidably carried in a bracket 33, which is affixed to end 49. Second end 49', which can be provided for access to internal components, can be covered by a removable end cap 31.

The components of the device 10, which can be contained within housing 30, include a DC power supply, indicated by drawings of batteries 36, a beam processing apparatus 60, and a printed circuit board 37, on which is mounted the components of a diode driver circuit 34, and a signal conditioning circuit 35.

Signal conditioning circuit 35 of the device 10 of the present invention is comprised of an ordinary current-to-voltage converter, threshold comparator, and microprocessor. A sensitivity adjustment is provided for eliminating background noise. Signal conditioning circuit 35 is energized by the voltage of power supply 36, conveyed by electrical leads 45 and 46.

Diode driver circuit 34 is also energized by power supply 36 through leads 45 and 46. Diode driver circuit 34, in turn, supplies energizing voltage through electrical lead 42 to cause laser diode 11 to emit light, and through lead 43 to allow photodiode 23 to convert detected light into electrical signals, which are forwarded by driver 34 to conditioner 35.

Beam processing apparatus 60 is comprised of a main optical housing 22, a secondary optical housing 18, a laser diode housing 13, a laser light generating diode 11, a collimating lens 15, a beamsplitter 19, a dichroic filter 28, a focusing lens 27, and a PIN photodiode 23.

Main optical housing 22 is formed around a horizontal opening 50, the central axis of which is coaxial with the central axis of opening 47 in housing 30 and the first end 49 thereof. The inner surface of opening 50 must be rendered non-reflective by being coated with a non-reflective substance. Main optical housing 22 is further configured with a larger opening 62 for receiving secondary optical housing 18 therein. Within the opening 62, an interface plane 65 is provided for interfacing with a matching interface plane 66 of optical housing 18. Interface planes 65 and 66 are set at an angle of 45 degrees to a line normal to the axis of collimating tube 16. A beamsplitter 19 is mounted at the interface planes 65 and 66 of housings 22 and 18, parallel to the 45 degree angle of planes 65 and 66.

Main optical housing 22 is further pierced by a vertical opening 39, in which focusing lens 27 and focusing tube 24 are mounted. Focusing tube 24, which has a PIN photodiode 23 mounted in a central hole therethrough, at a distal end from lens 27, is received within close tolerances by, and is telescopically movable within, opening 39, except when fixed by setscrew 25. Focusing lens 27 converts a collimated beam of light 48 into a converging beam 26. When focusing tube 24 has been positioned so that the focal point of converging beam 26 has been made co planar with a light-sensing surface of photodiode 23, focusing tube 24 is rigidly locked in place by setscrew 25.

Secondary optical housing 18, which is inserted in and mounted to main optical housing 22 by mechanical means such as adhesive, serves to mount collimating tube 16 and collimating lens 15 therein. Collimating tube 16, which contains lens 15 in an end thereof distal from interface plane 66, is closely received within an opening 63 of secondary housing 18 so that its central axis is also coaxial with openings 47 and 50. The inner surface of opening 63 must also be rendered non-reflective by being coated with a non-reflective substance. Tube 16 is free to move telescopically through opening 63, except when restrained by setscrew 17.

Metallic cylindrical housing 13 is configured so as to be accepted by an opening 64 in secondary optical housing 18, while closely receiving a portion of collimating tube 16. A first end of housing 13 contains a laser light generating diode 11, mounted in a central hole therethrough, and held by suitable mechanical means, such as fasteners 12. Collimating tube 16 is free to move telescopically in the opening 64 of housing 13 until restrained by set screw 17, which penetrates secondary optical housing 18. Of course, it will be seen by those skilled in the art that housings, such as 22, 18, and 13, which have been referred to as metallic, may also be non-metallic. Openings which have been referred to as non-reflective must be non-reflective, regardless of the material used in their construction.

Collimating lens 15 is rigidly fixed within collimating tube 16, at an end thereof proximate laser light generating diode 11. Collimating lens 15 is positioned in front of laser diode 11 such that lens 15 intercepts and focuses a diverging beam 14 of light emitted by diode 11 into a collimated beam 20, the central axis of which is coaxial with openings 47, 50, 62, 63, and 64. Collimating lens 15 is rigidly mounted in collimating tube 16 with adhesive or other mechanical means such that the position of lens 15 can be adjusted relative to the emitting surface of laser diode 11 to fix the focal point of beam 20. Beam 20 is the resultant, focused at infinity, of the collimation of diverging beam 14. When tube 16 has been positioned for optimum collimation of beam 20, setscrew 17 is tightened to hold tube 16 rigidly in place.

Presently, the ultimate operating range of the present invention is set at fifty feet, as diagrammed in the graph of FIG. 3. It will be seen by those skilled in the art that, even though the device of the present invention uses a single lens for the collimation of beam 14, the ultimate range and performance of the device can be enhanced by using a lens or compound lens assembly of different parameters.

An ordering beamsplitter 19 is mounted at the 45 degree angle interface of optical housings 22 and 18 so as to extend diagonally across secondary optical housing 18 at an angle of 45 degrees relative to a line normal to the inner surface of optical housing 18, such a line also being coaxial with the axis of the above-listed opening 50 and other axially-aligned portions of the tachometer. Beam splitter 19 is secured by an adhesive such as epoxy to the diagonal face of optical housing 18. The dielectric-coated beam splitter 19 provides for a 50/50 ratio of the transmitted to reflected electromagnetic beam energy incident upon it. The reflected portion (50%) of such an incident beam 20, designated beam 21, is absorbed in the non-reflective surface of optical housing 18.

An additional device mounted so as to have its central axis coaxial with the openings of the above-listed components is dichroic spectral line filter 28, held in place by holder 29. Holder 29, in turn, is mounted in opening 50 by appropriate mechanical means, such as adhesive, for instance. Filter 28, in holder 29, is rigidly mounted in opening 50 proximate first end 49 of housing 30. Filter 28, which is preferably comprised of a spectral line filter, is a standard hardware item, selected for its ability to be at least 60% transparent to the electromagnetic wavelength of the laser diode's operating frequency, in this case, a wavelength of 670 nm. The primary function of filter 28 is to prevent the entrance of ambient electromagnetic energy with wavelengths other than 670 nm while simultaneously passing at least 60% of the selected wavelength embodied in reflected beam 40.

It will be seen by those skilled in the art that the device of the present invention could be operated without spectral line filter 28 if maximum noise immunity is not needed. Also, laser diode 11 could be modulated and synchronous detection techniques could be employed within signal conditioner 35 to provide high ambient noise immunity either in conjunction with or without spectral line filter 28.

When the laser tachometer 10 is operated, laser diode 11, energized by appropriate electrical voltage obtained from diode driver 34 via lead 42, produces a high intensity beam 14 of coherent light. Beam 14 is a divergent beam composed of light in the visible range, typically 670 nm (red); however, it will be seen by those skilled in the art that a laser diode emitting coherent light in other portions of the visible spectrum, such as green, for instance, would suffice as well.

Collimating lens 15 is arranged in front of laser diode 11 such that, by means of being positioned by collimating tube 16, lens 15 intercepts and focuses the beam 14 into the resulting collimated beam 20, focused at infinity. Presently, the ultimate operating range of the present invention is set at fifty feet, as diagrammed in the graph of FIG. 3.

During operation, beam 20 is incident at an angle of 45 degrees upon a first face of ordering beamsplitter 19. A 50% portion of beam 20, designated beam 21, is reflected by beamsplitter 19 and absorbed in the non reflective coating of secondary optical housing 18.

The remaining 50% portion of beam 20 is passed through spectral line filter 28 which is mounted into holder 29 at the open end of the optical housing 22. An operator directs the beam 20 onto an object 41 for which rotational speed is to be measured. As a perfectly smooth and symmetrical body 41 would not provide a point of reference for the counting of its revolutions, a device such as 44, which can be a strip of reflecting tape, for instance, can be affixed thereto.

Typically, when beam 20 is incident upon a surface, such as member 41, undergoing rotational or linear translational motion, with reflective element 44 affixed thereto, beam 20 is reflected through a 180 degree angle. The beam so reflected is referred to as beam 40. It should be noted that, in those cases where member 41 may possess some appropriate variation in the reflectivity of its surface, either natural or man-made, to act as a reference point for counting revolutions, it may not be necessary to introduce reflective element 44. The fact that laser beam 20 is composed of coherent red visible light enhances the targetability of the device.

The intensity of reflected beam 40 is pulsatingly modulated by reflective element 44. At least 60% of the reflected beam 40 passes through ordinary spectral line filter 28 which is 60% transparent for electromagnetic waves with a wavelength of 670 nm. The reflected beam 40 impinges upon a second face of 50/50 beamsplitter 19 where 50% of beam 40 passes through beamsplitter 19 and is absorbed by the non-reflective coating on the inner walls of opening 63. The remaining 50% of beam 40 is reflected through an angle of 90 degrees, thereby becoming the beam designated as beam 48. The still collimated beam 48 is converted by focusing lens 27 into a converging beam 26, the focal point of which is adjusted to be co planar with the active light-sensing element of PIN photodiode 23. PIN photodiode 23 is permanently fixed, by mechanical means such as adhesive, in focusing tube 24, which, together with focusing lens 27, is concentrically held in an opening 39 made in main optical housing 22. Once the diode 23 is adjusted for maximum output, the focusing tube 24 is rigidly locked in place in opening 39 by setscrew 25. The PIN photodiode 23 has a peak spectral response at or near 670 nm to match its response to the coherent light emitted by the laser diode 11. In the event of the use of a laser diode which emits a different wavelength of coherent light, a photodiode having a spectral response to match would need to be selected accordingly. For example, diode 11 could emit light in the visible green wavelength range, in which case, the spectral line filter 28 and photodiode 23 would be selected and matched for optimum performance at that wavelength.

The photodiode 23 converts the converging beam 26 incident upon it into an electrical current which is input via electrical lead 43 to ordinary signal conditioning circuit 35. Signal conditioning circuit 35, by proper setting of its triggering level, provides the capability of discriminating against background electromagnetic noise and components in the reflected beam caused by natural variations in reflectivity of the targeted surface.

Diode driver 34, photodiode 23, and signal conditioning circuit 35 in the present invention are powered by DC battery pack 36 via electrical leads 45 and 46. However, those skilled in the art will appreciate that the device 10 of the present invention could also be powered by an AC driven DC power supply.

The device 10 of the present invention is illustrated as having an on board readout capability via LCD display 51 and lead 61, allowing device 10 to be used as a stand-alone RPM measuring device. However, it will be seen that device 10 could also be designed to interface directly with a device such as a data logger via electrical connector 38, either with or without an on-board readout 51.

Figure 2:
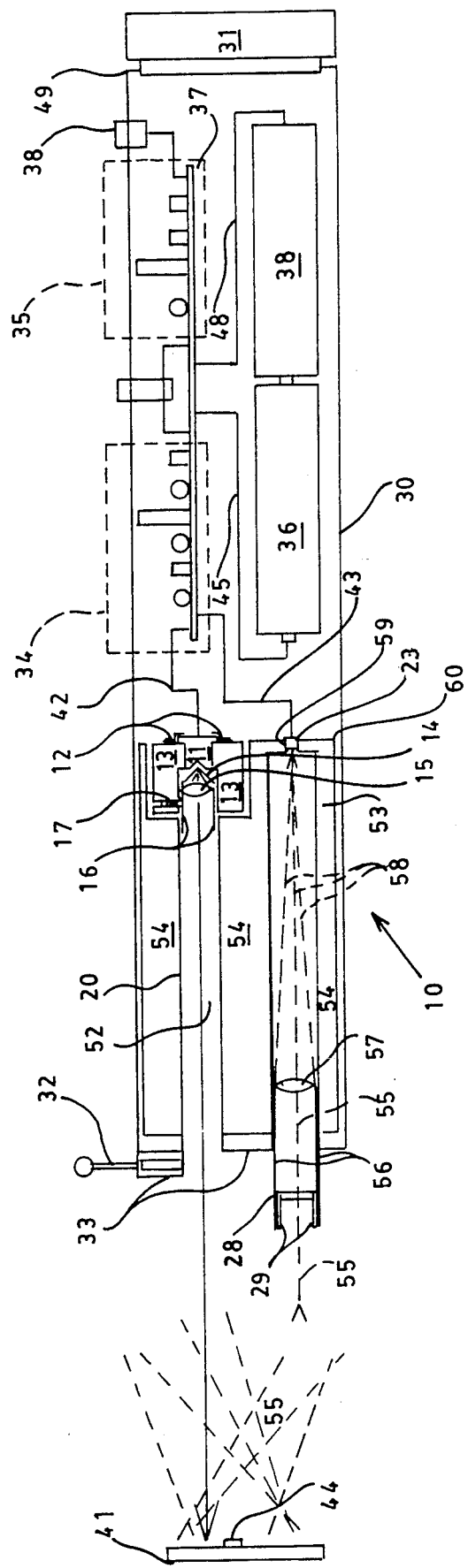
FIG. 2 is a side view drawing of a second embodiment of the tachometer of the present invention showing parallel beam paths.

An alternate embodiment of the device 10 of the present invention is shown in FIG. 2, wherein two parallel beam paths are used instead of a single, coaxial beam path. Within the upper beam path opening 52, a laser diode 11 is deployed in a laser diode housing 13. A focusing lens 15 is contained in a collimating tube 16 such that its position can be adjusted relative to the emitting surface of diode 11. Once the desired adjustment is obtained, the collimating tube 16 is held fixed by setscrew 17. In this embodiment, the diverging laser beam 14, after being collimated by focusing lens 15, is transmitted as beam 20, unattenuated, via eccentrically located cylindrical hole 52 of main optical housing 54, to the rotational or translational element 41 where it is reflected. In this embodiment, 100% of the beam 20 is incident on the surface of member 41, which can also have reflecting element 44 attached thereto. A portion 55 of the light reflected therefrom is intercepted by spectral line filter 28 which is rigidly mounted via adhesive in the first end of focusing tube 56 via holder 29. Focusing lens 57 is mounted in the second end of focusing tube 56, the assembly being slidable within the first end of eccentrically located cylindrical hole 53. The inner surface of cylindrical hole 53 must be non-reflective, preferably by being treated with a non-reflective substance. The distance between lens 57 and photodiode 23 is adjusted so that the focal point of converging beam 58 is co planar with the active element of PIN photodiode 23. Photodiode 23 is mounted in hole 59 via adhesive or other means such that the central axis thereof is co-axial with the central axis of hole 53. The output signal of photodiode 23 is fed via electrical lead 43 to signal conditioning circuitry 35.

FIG. 3 is a graph of tests made using the device 10 of the first embodiment of the present invention, depicting the analog signal voltage output of the current to voltage converter of signal conditioner 35 versus the tachometer to target distance. Beginning at a tachometer to target distance of zero feet, a signal of 3.2 Volts was developed by the high intensity of the reflected beam 40 until a separation distance of approximately 12 feet was attained. In the present invention, a power supply voltage of 6.0 Volts was used, which limits the output of the current to voltage converter to 3.2 Volts. However, this limiting voltage could be changed to a higher power supply voltage, if desired. A reading of 100 millivolts was obtained at a distance of 50 feet. The intrinsic electrical noise, which is the noise present at the output of the current to voltage converter even in the absence of reflected beam 40, was measured at 5 millivolts. The comparator threshold voltage may be adjusted to a value higher than 5 millivolts to provide operation at or beyond 50 feet.

Thus, it will be seen that there has been provided a description of an improved optical tachometer which use the art of laser technology to extend the distance from which measurements of the speed of a rotating body can be made, and also to allow the making of such measurements under extremely bright ambient light conditions. In the embodiment illustrated, a solid-state semiconductor device was used to generate the laser light, in the red visible light range, without extra amplification. However, those skilled in the art will appreciate that variations in the embodiments illustrated are possible without departing from the scope of the present invention.

While preferred embodiments of a device constructed in accordance with various features of the present invention has been described herein, no attempt has been made to limit the device to such description. Rather, such description has been intended to embody all possible variations and alternate constructions falling within the spirit and scope of the invention as defined in the appended claims.

Accordingly, this invention is limited only by the claims appended hereto, and their equivalents, when taken in combination with the complete description contained herein.

I claim:

1. A visible light tachometer for measuring the rotational speed of a selected rotating body without making physical contact with said rotation body, said rotating body having visible light reflecting characteristics, comprising:

power supply means for supplying electrical energy to said tachometer;

generating means for generating a beam of electromagnetic radiation at a selected wavelength visible to the human eye;

optical beam processing means for collimating and directing said beam to impinge onto a portion of said rotating body whereby a portion of said beam is reflected from said rotating body due to said reflecting characteristics to form a reflected visible light beam of said selected wavelength;

optical filter means interposed into said beam and said reflected portion of said beam for excluding transmission of a major portion of light of a wavelength different than said selected wavelength and for transmitting a major portion of light of said selected wavelength; and signal conditioning circuitry for detecting, conditioning, and converting said reflected light beam into electrical signal pulses representative of said rotational speed of said rotating body.

2. The tachometer of claim 1 further including display means for displaying said rotational speed of said rotating body.

3. The tachometer of claim 1 including further output means for outputting to other electrical devices said electrical signal pulses representative of said rotation rate of said rotating body.

4. The tachometer of claim 1 wherein said optical filter means includes at least one dichroic lens filter.

5. The tachometer of claim 1 further comprising a reflecting means affixed to said rotating body for increased reflecting characteristics to enhance intensity of said reflected portion of said beam, said reflecting means indicating each complete revolution performed by said rotating body.

6. The tachometer of claim 1 wherein beam paths of said impinging beam and said reflected beam are co-axial, said reflected beam being reflected from said rotating body at an angle of substantially 180 degrees from said impinging beam.

7. An improved non-contact tachometer for determining the rotational speed of a rotating element of a machine, comprising:
  a laser light generating means for generating an electromagnetic radiation at a selected wavelength within the spectrum of visible light;
  reflective marker means affixed to said rotating element for indicating each complete revolution of said rotating element;
  directing means for collimating and directing a beam of said electromagnetic radiation so as to impinge upon said reflective marker means whereby a portion of said beam is reflected from said reflective marker means to produce a reflected beam of said selected wavelength;
  detecting means, selected for sensitivity to said selected wavelength, for detecting said reflected beam and for generating electrical signals corresponding to said reflected beam;
  optical filter means interposed in said impinging beam and said reflected beam for transmitting substantially no electromagnetic radiation to said detecting means except for said selected wavelength;
  focusing means for focusing said reflected beam into a converting beam having a focal point which is co-planar with said detecting means; and
  signal processing circuitry for receiving and amplifying said electrical signals of said detecting means and converting said electrical signals into electrical pulses representative of said rotational speed of said rotating element, said signal processing circuitry including circuit sensitivity adjustment means, analog-to-digital converter means and display means for displaying said rotational speed of said rotating element.

8. An improved non-contact type tachometer for determining the rotational speed of a rotating element of a machine, comprising:
  a laser light generating means for generating an electromagnetic radiation at a selected wavelength within the spectrum of visible light;
  directing means for directing a beam of said electromagnetic radiation so as to impinge upon a portion of said rotating element;
  reflective marker means affixed to said rotating element for indicating each complete revolution of said rotating element;
  detecting means, selected for sensitivity to the same wavelength of light generated by said generating means, for detecting a portion of said impinging beam reflected back from said rotating element and for generating electrical signals corresponding to said detected portion reflected back from said rotating element;
  focusing means for focusing said electromagnetic radiation into a collimated beam for impinging on said rotating element, and for focusing a reflected portion of said collimated beam into a converging beam having a focal point which is co-planar with a portion of said detecting means;
  signal processing circuitry for amplifying said electrical signals received from said detecting means, and converting said signals into electrical pulses representative of said rotational speed of said rotating element; and
  power supply means for supplying electrical power to energize electrical components of said tachometer.

9. The device of claim 8 further comprising optical filter means interposed in said impinging beam and said reflected portion of said impinging beam for transmitting substantially no electromagnetic radiation to said detecting means except a wavelength coinciding with said selected wavelength generated by said generating means.

10. The device of claim 8 wherein said signal processing circuitry includes circuit sensitivity adjustment means for adjusting input signal sensitivity of said signal processing circuitry.

11. The tachometer of claim 8 wherein said signal processing circuitry includes analog-to-digital converter means and digital display means for displaying said rotational speed of said rotating element.

* * * * *